US007075570B2

(12) United States Patent  (10) Patent No.: US 7,075,570 B2
Nagaoka  (45) Date of Patent: Jul. 11, 2006

(54) METHOD OF PROCESSING FILES AND AN APPARATUS THEREOF

(75) Inventor: Shiro Nagaoka, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 686 days.

(21) Appl. No.: 09/978,543

(22) Filed: Oct. 18, 2001

(65) Prior Publication Data

US 2002/0052886 A1    May 2, 2002

(30) Foreign Application Priority Data

Nov. 1, 2000 (JP) ............................. 2000-334974

(51) Int. Cl.
*H04N 5/76* (2006.01)

(52) U.S. Cl. .................. 348/231.2; 348/231.3

(58) Field of Classification Search ............ 348/231.2, 348/231.3, 231.5, 231.6, 231.7, 231.9, 231.8; 707/201, 101, 102, 200
See application file for complete search history.

(56) References Cited

U.S. PATENT DOCUMENTS

| 5,086,072 | A * | 2/1992 | Trullas et al. ............... 514/531 |
|---|---|---|---|
| 5,513,351 | A * | 4/1996 | Grantz ......................... 707/200 |
| 5,745,902 | A * | 4/1998 | Miller et al. ................. 707/200 |
| 5,758,352 | A * | 5/1998 | Reynolds et al. ............ 707/200 |
| 5,926,805 | A * | 7/1999 | Hurvig et al. ................ 707/200 |
| 6,286,013 | B1 * | 9/2001 | Reynolds et al. ............ 707/200 |
| 6,473,569 | B1 * | 10/2002 | Shidate et al. ............... 396/280 |
| 6,701,063 | B1 * | 3/2004 | Komoda et al. ........... 348/231.2 |
| 6,704,047 | B1 * | 3/2004 | Tsutsui ...................... 348/231.7 |
| 6,760,065 | B1 * | 7/2004 | Whitcher ................... 348/231.2 |
| 6,810,441 | B1 * | 10/2004 | Habuto et al. ............ 348/231.9 |
| 6,816,189 | B1 * | 11/2004 | Nagaoka et al. .......... 348/231.2 |
| 6,992,710 | B1 * | 1/2006 | Nagaoka ................... 348/231.2 |
| 2001/0043366 | A1 * | 11/2001 | Kameyama ................. 358/403 |
| 2002/0051065 | A1 * | 5/2002 | Takahashi .............. 348/231.99 |
| 2002/0051629 | A1 * | 5/2002 | Endo .......................... 386/113 |
| 2002/0051641 | A1 * | 5/2002 | Nagaoka ..................... 396/429 |
| 2002/0080252 | A1 * | 6/2002 | Nagaoka et al. ............ 707/200 |
| 2004/0047615 | A1 * | 3/2004 | Itoh ........................... 386/111 |
| 2004/0051785 | A1 * | 3/2004 | Yokonuma et al. ..... 348/207.99 |

FOREIGN PATENT DOCUMENTS

JP    2001109651 A  *  4/2001

* cited by examiner

*Primary Examiner*—David Ometz
*Assistant Examiner*—Jason Whipkey
(74) *Attorney, Agent, or Firm*—Pillsbury Winthrop Shaw Pittman, LLP

(57) ABSTRACT

A method and an apparatus of processing files according to the present invention comprise a first and second apparatus for recording data in a manner complying with the DCF standardized file-managing structure. In the method and apparatus, a file for management is formed with respect to a directory recorded in a manner complying with the DCF standardized file-managing structure. In the file, a virtual directory name in a form not defined as the DCF standard is to be compatible with a DCF standardized directory that corresponds to the virtual directory name. The file for management is to be maintained, whereas data is transmitted between the first and second apparatus.

12 Claims, 8 Drawing Sheets

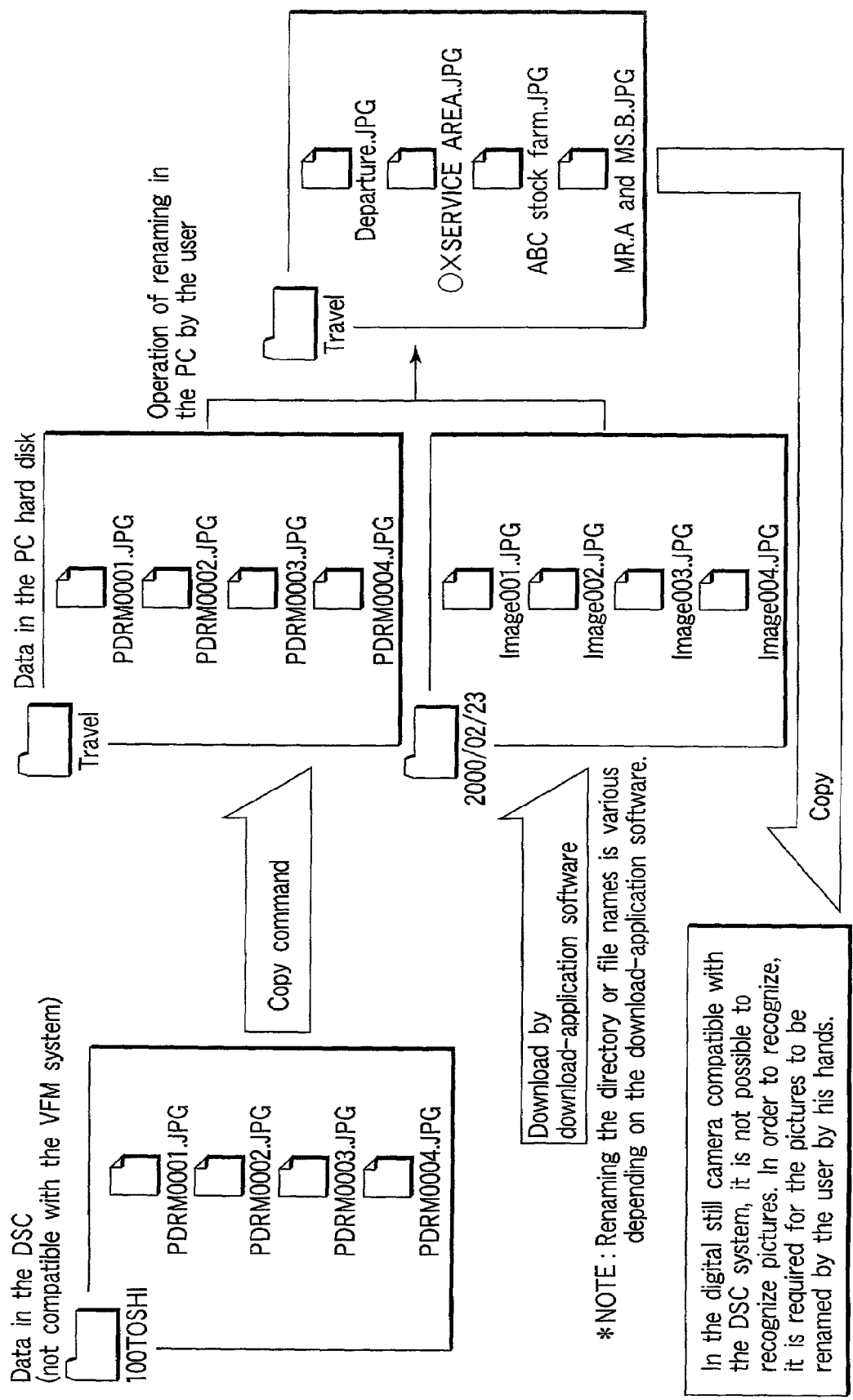
F I G. 6

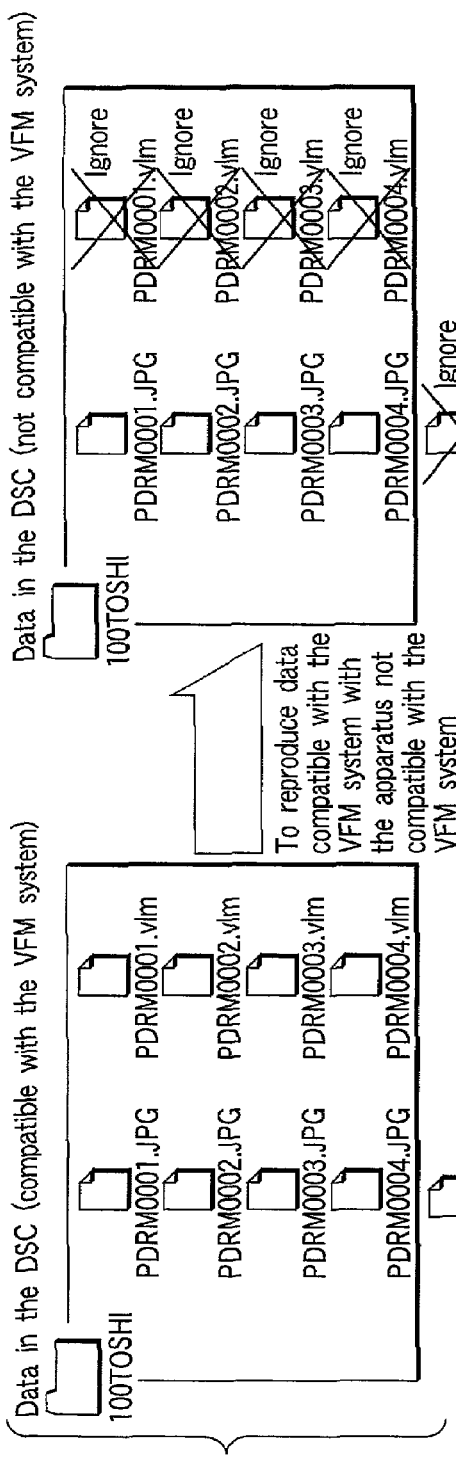
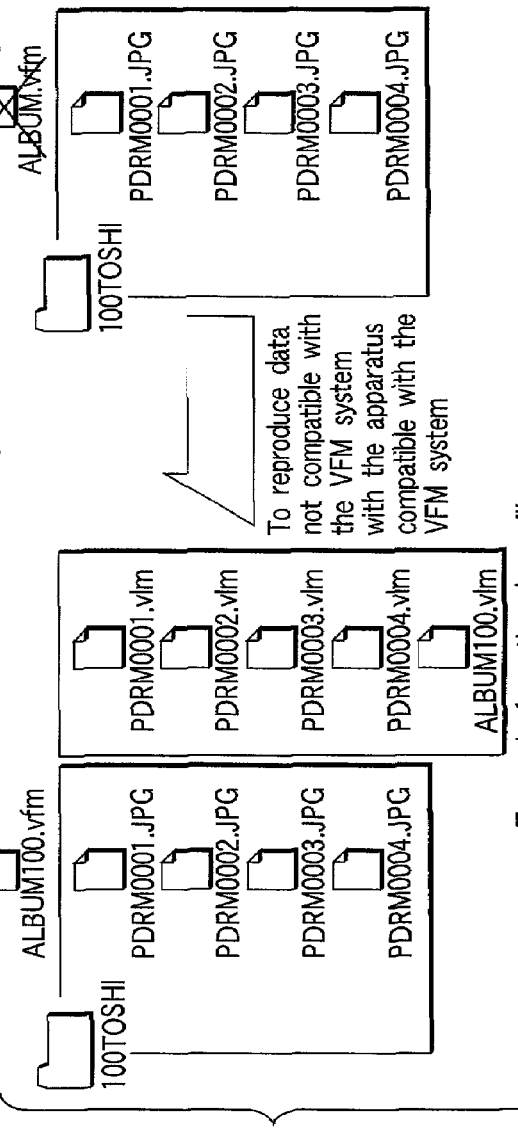
F I G. 7A
F I G. 7B

METHOD OF PROCESSING FILES AND AN APPARATUS THEREOF

CROSS-REFERENCE TO RELATED APPLICATIONS

This application is based upon and claims the benefit of priority from the prior Japanese Patent Application No. 2000-334974, filed Nov. 1, 2000, the entire contents of which are incorporated herein by reference.

BACKGROUND OF THE INVENTION

1. Field of the Invention

The present invention relates to a method and improvement of an apparatus for processing files, which is compatible with a DCF (Design rule for Camera File system) standard.

2. Description of the Related Art

As is well known, in a digital still camera recently spread widely, a photographed optical image of the object is generally converted into digitalized image data and the resulted data is recorded in a recording medium in a file managing structure compatible with the DCF standard.

When a digital still camera records or reproduces digital image data in or from a recording medium, the file managing structure on the basis of the DCF standard makes it remarkably convenient to manage the operations.

In the file managing structure based on the DCF standard, however, a user is not permitted to give an arbitrary file name to a group of data recorded in the recording medium, which gives rise to a problem that the user cannot deal with it in a convenient manner.

Particularly, it is not permitted for the user to give an arbitrary name to a directory, which is significant for a structure to manage files. Therefore, the aforementioned problem has been even more serious.

In addition, in a digital still camera compatible with the DCF standard, capacity of recording media connected to the apparatus has been increased from year to year. In the future, when a recording medium comes to assume a role of a hard disk itself of a PC (Personal Computer) server by using radio transmission art, it is anticipated that the capacity will become huge.

In view of the above-depicted status on the art, if a user cannot give arbitrary names to files or directories, the user's convenience to manage files is considerably impaired.

BRIEF SUMMARY OF THE INVENTION

An object of the invention, which has been achieved in consideration of the situation described above, is to provide a method of processing files and an apparatus thereof, which make it possible for the user to give arbitrary file names or directory names, maintaining compatibility with an existing file managing structure complying with the DCF standard, so as to effectively improve user's convenience to manage files.

According to the invention, the above object is achieved by providing a method of processing files including a first and second apparatuses, each apparatus for recording image data in a built-in recording medium in a manner of complying with a file-managing structure compatible with a DCF standard, and permitting the first and the second apparatus to mutually transmit the recorded image data therebetween, wherein a virtual directory name in a form not defined as the DCF standard can be set with respect to a directory recorded in each recording medium of the first and second apparatus in a manner of complying with the file-managing structure compatible with the DCF standard, a file on virtual directory management, wherein the virtual directory name is to be compatible with a directory name that corresponds to the virtual directory name and complies with the DCF standard, is formed, and the file on virtual directory management is to be maintained, whereas the image data is transmitted mutually between the first and second apparatus.

In another aspect of the invention, there is also provided a apparatus for processing files including a first apparatus for recording image data in a built-in recording medium in a manner of complying with a file-managing structure compatible with a DCF standard, and a second apparatus, connected to the first apparatus in a manner capable of transmitting data, for recording image data in a built-in recording medium in a manner of complying with a file-managing structure compatible with a DCF standard, comprising:

an input section inputting and setting a virtual directory name in a form not defined as the DCF standard with respect to a directory recorded in each recording medium of the first and second apparatus in a manner of complying with the file-managing structure compatible with the DCF standard; and a recording section defining the virtual directory name input by the input section as a recording name, forming a file on virtual directory management, wherein the virtual directory name is to be compatible with a directory name that corresponds to virtual directory name and complies with the DCF standard, and recording the file on virtual directory management in the recording medium, wherein the file on virtual directory management is to be maintained, whereas the image data is transmitted mutually between the first and second apparatus.

According to the aforementioned structure and method, although the image data is transmitted mutually between the first and second apparatuses, the file on virtual directory management is maintained. And thus, while maintaining compatibility with the existing file managing structure that complies with the DCF standard, the user can give arbitrary names to files or a directory. Furthermore, user's convenience to manage files extending over a plurality of apparatuses can be effectively improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 6 is a diagram for explaining the flow of data between a digital still camera compatible with a DCF system but not with a VFM system and a PC;

FIGS. 7A and 7B are diagrams for explaining flows of data between the digital still camera compatible with the DCF & VFM system and the digital still camera compatible with a DCF system but not compatible with the VFM system, respectively.

DETAILED DESCRIPTION OF THE INVENTION

Figure 1:
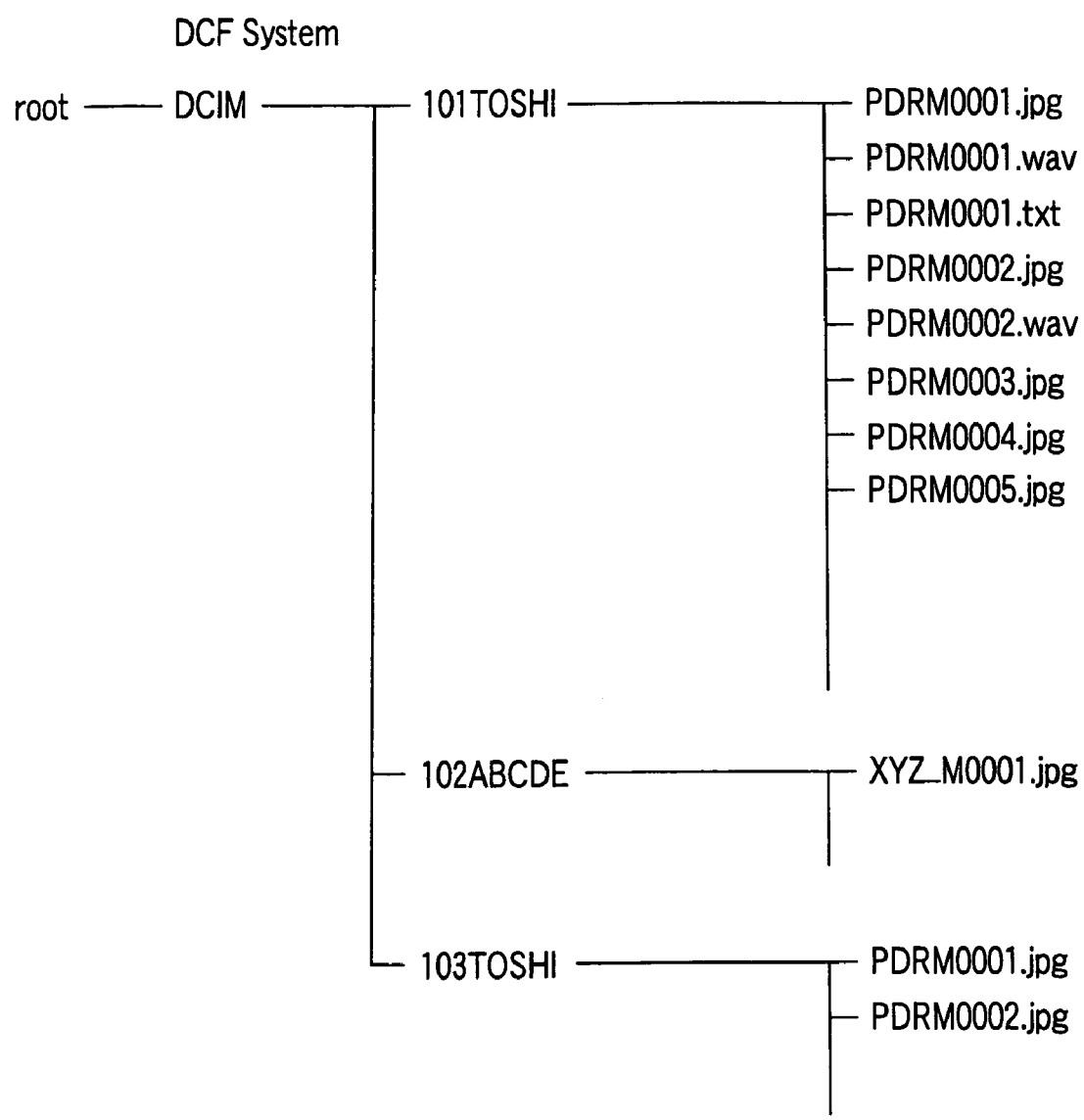
FIG. 1 is a diagram for explaining an example of a basic file managing structure on the basis of the DCF standard.

An embodiment of the invention now will be described hereinafter in detail referring to the accompanying drawings. First, FIG. 1 shows an example of a basic file managing structure on the basis of a DCF standard. The file managing structure depends on the content arranged by a DCF version 1.0, a standard of a camera file system.

According to the DCF standard, there are arrangement regulated in detail with regard to a name of a file in data-recording, a name of a directory to store the file, a storing location, and the like. The details of the regulations are omitted but the main items will be described below.

(1) DCF file name . . . ####****. $$$

: Character string in four figures by using vendor's own alphameric characters and _.

****: File number (Numeric characters from 0001 through 9999)

$$$: Extension expressing data format (2) DCF directory name . . . *** #####

***: Directory number (Numeric characters from 100 through 999)

: Character string in five figures by using vendor's own alphameric characters and _.

(3) DCF directory

As shown in FIG. 1, a directory named in the above item (2) is formed and stored with the file name given in the above item (1) in a DCIM (DCF Image root directory).

(4) DCF Object

In terms of file names, when each file has the identical name for a part of ####**** and has a different extension from the others, those files are handled as a group of data, in which the files are associated with each other.

(5) Other arrangement

When Satisfied with the above items (1) to (4), a group of data can be associated therewith, using a new extension. For example, a group of data such as PDRM0001. TXT, PDRM0001. THM, and PDRM0001. WAV can coexist with respect to still image data having PDRM0001. JPG.

Data, each having a different extension from the others, are considered as a group of data enclosed under the name of PDRM0001. When an apparatus for reproduction can be compatible with the group of data, text data (having an extension TXT), thumbnail data (Extension THM) and sound data (Extension WAV) can be reproduced together with a image display.

Although each manufacturer can determine a way of handling the group of data independently, it is obliged to reproduce a still image as a minimum requirement. Note that, in a case where data can be handled in an apparatus for reproduction by means of an extension, the other data can be reproduced. However, the relevant operation is not obliged.

Figure 2:
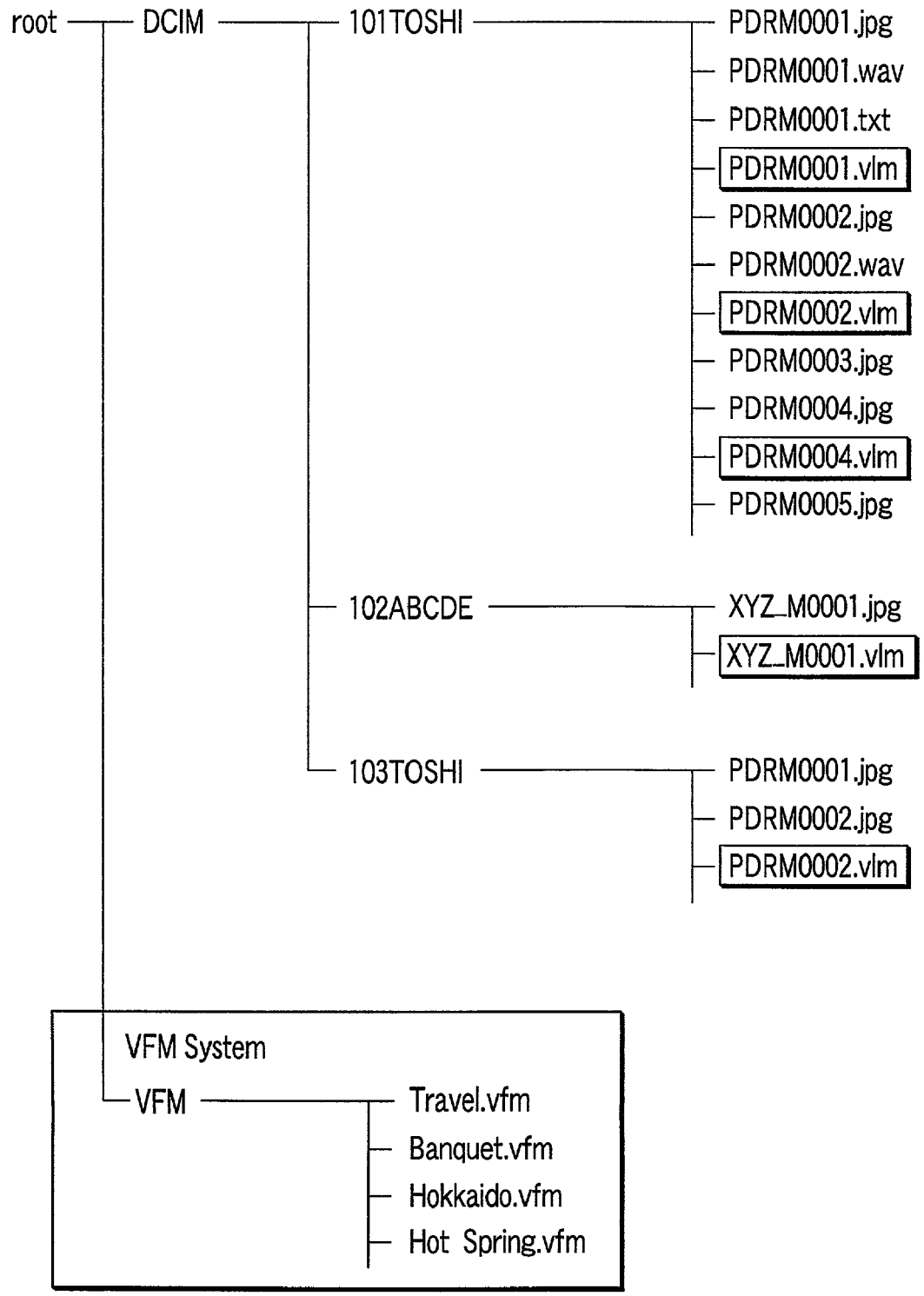
FIG. 2 is a diagram for explaining an example of a file managing structure to be applied to the invention.

Next, FIG. 2 is a diagram for explaining an embodiment of a file managing structure to be applied to the invention. In FIG. 2, a group of files enclosed with quadrantal frames expresses files that have been added to the aforementioned basic file managing structure.

In other words, the present file managing structure has two kinds of file as managing files. One file is a virtual-directory managing file having an extension vfm. The other is a virtual-file managing file having an extension vlm.

Of these two kinds of file, the managing file having the extension vfm exists independently of the DCF standard and defines a virtual directory. The file existing in the virtual directory defines reference information to a real file existing in the DCF standardized file managing structure.

On the other hand, the managing file having the extension vlm exists complying with the DCF standard. This file is an objective file to which the user gives an arbitrary file name.

Due to the DCF standard, the managing file having the extension vlm is handled as a group of data, associated with the other files having an extension other than the extension vlm and having the identical file names. The managing file with the extension vlm defines a name given virtually by the user to the corresponding file.

Figure 3:
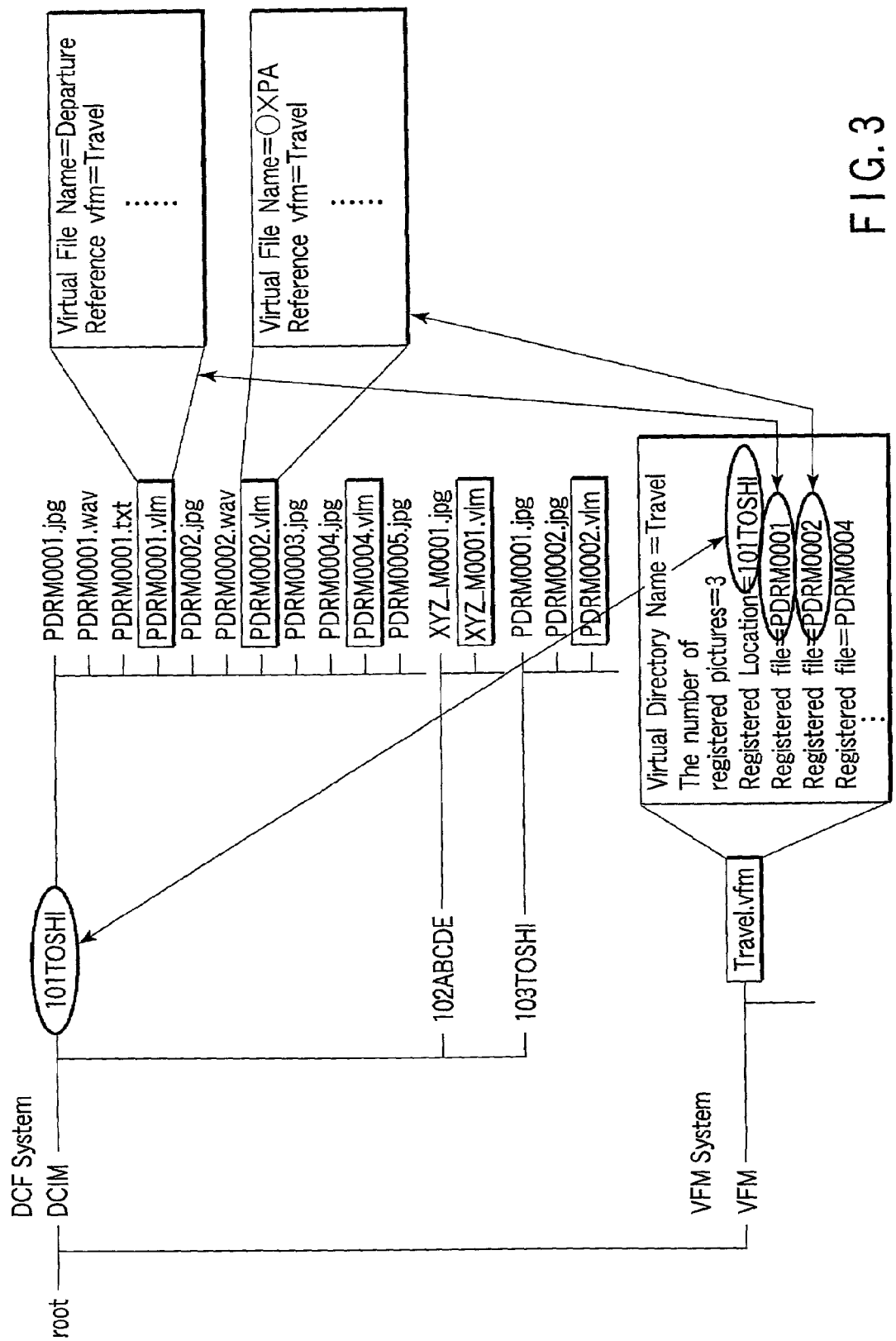
FIG. 3 is a diagram for explaining relation between a managing file having an extension vfm and managing files having extension vlm respectively.

FIG. 3 shows the relation between the managing file with the extension vfm and the managing file with the extension vlm. In FIG. 3, a file named "Travel. vfm" is a managing file defining a virtual directory.

In the managing file "Travel. vfm", a virtual directory name (in this case, Travel), the number of registered images, a registered location of real data, i.e., a directory (in this case, 101TOSHI), real file names registered therein (in this case, PDRM0001, PDRM0002, PDRM0004), and the like are recorded. On the basis of information of the managing file "Travel. vfm", real data existing in the DCF standardized file managing structure is found.

The found directory (in this case, 101TOSHI) is searched. When the managing file with the extension vlm exists, the managing file is analyzed.

For example, in FIG. 3, the file with "PDRM0001. vlm" is a managing file defining a virtual file name. In the managing file, a virtual file name (in this case, departure), a name (in this case, travel) of a managing file with the extension vfm whose file refers to this managing file, and the like are recorded.

With the managing file having the extension vfm and the managing file having the extension vlm, a virtual directory to which the user has given an arbitrary name and a group of virtual files included in the virtual directory to which the user has given arbitrary names, are constructed.

A location of the real file corresponding to the virtual file name is recorded in the managing file with the extension vfm. Thus, when the data is actually read from a recording medium, the real data is found from the DCF standardized file managing structure on the basis of information of the managing file with the extension vfm.

As pointed out above, in the present file managing structure, two of the managing files, one with the extension vfm and the other with extension vlm, are used in a manner of matching to the DCF standardized file managing structure so that the user can give arbitrary names to files or a directory, while maintaining compatibility with the existing file managing structure that complies with the DCF standard.

The virtual managing files prepared for the user to give arbitrary names are separated into two kinds of the managing file, one with the extension vfm and the other with the extension vlm, and the managing files with the extension vlm are included into structural elements of a data group in the DCF standardized file managing structure. Because the managing files with the extension vlm can be handled as objects to be erased together with the objective data in the DCF standardized file managing structure, when deleting data.

For example, when it is required that the file "PDRM0001" be erased, the file "PDRM0001.vlm" can be batch-erased together with the files, "PDRM0001. jpg", "PDRM0001. wav" and "PDRM0001. txt".

Furthermore, in this case, the managing files with the extension vfm remains without being erased. Thus, the other files which have not been erased, such as "PDRM0002", "PDRM0004", or the like, can be searched.

According to the aforementioned file managing structure, the user can obtain environment where the user gives arbitrary names to data to be stored in the recording medium in the file managing structure compatible with the DCF standard.

This result means that the user can manage and use the group of data with arbitrary names given by him, by interpreting the managing files with the extension vfm or vlm. And thus, it becomes possible to realize the usage of managing an album of images by means of a digital still camera compatible with the DCF standard.

In a case where the digital still camera compatible with the DCF standard has character data of two bytes code, more efficient file management can be realized by using the data expressing Japanese characters.

Figure 4:
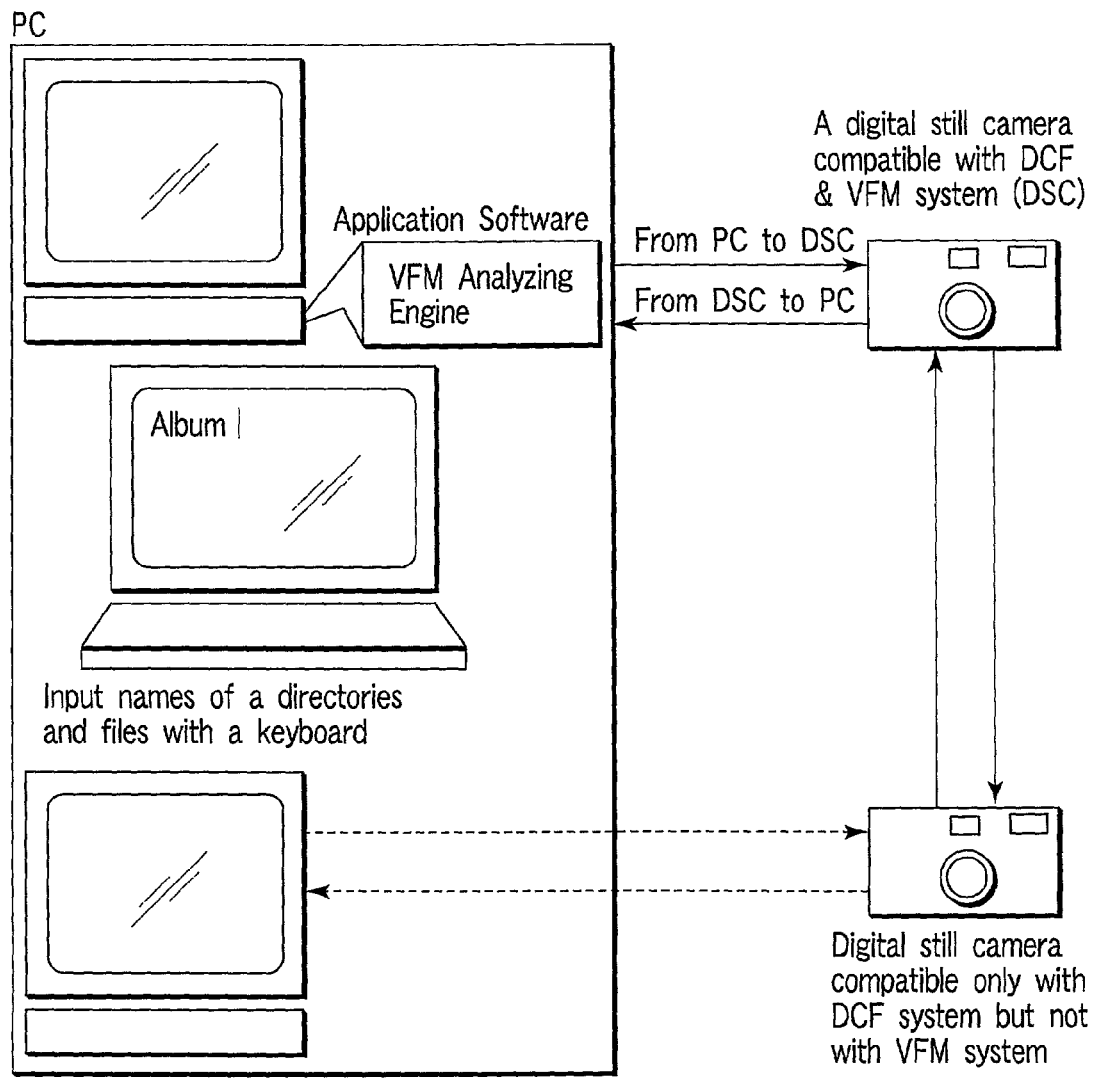
FIG. 4 is a diagram for explaining an outline of a method of processing files, assuming the file managing structure shown in FIGS. 2 and 3.

In the following, a method of processing files, based on the aforementioned file managing structure, will now be described hereinafter. FIG. 4 shows an outline of the file processing method.

The method of processing files comprises a PC (Personal Computer), a PC application software having a VFM analyzing engine, a digital still camera (DSC) compatible with a DCF & VFM system. The PC and the digital still camera are connected to each other by wire (USB: Universal Serial Bus), radio transmission (Bluetooth) or the like in a manner that data can be transmitted therebetween.

Note that the digital still camera compatible with the DCF & VFM system is connected to a digital still camera compatible only with the DCF system but not with the VFM system in a manner that data can be transmitted therebetween.

The digital still camera compatible with the DCF but not with the VFM system is connected to the PC in a manner that data can be transmitted therebetween, whereas a flow of the data is identical with one of the existing system.

Figure 5:
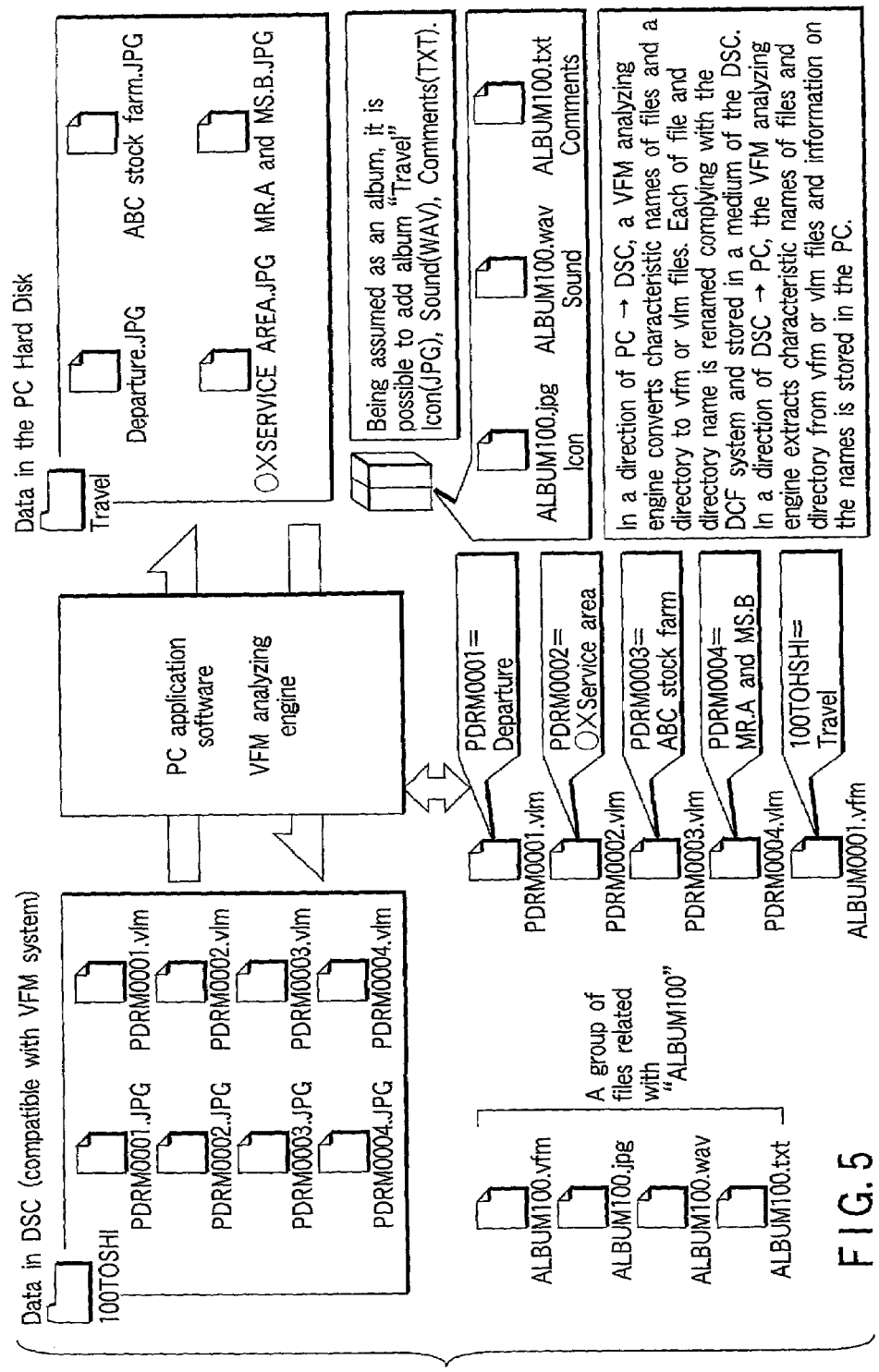
FIG. 5 is a diagram for explaining the flow of data between a digital still camera compatible with a DCF & VFM system and a PC.

FIG. 5 shows a data flow between the digital still camera compatible with the DCF & VFM system and the PC. FIG. 6 shows a data flow between the digital still camera compatible with the DCF but not with the VFM system and the PC.

FIGS. 7A and 7B show data flows between the digital still camera compatible with the DCF & VFM system and the digital still camera compatible with the DCF but not with the VFM system.

In the method of processing files shown in FIG. 4, when the file management is carried out in a manner described in FIGS. 2 and 3, the user edits a directory name or file names by using a keyboard on the PC.

Figure 8:
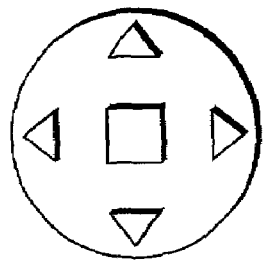
FIG. 8 is a diagram for explaining character input means for editing directory names or file names in the digital still camera compatible with the DCF & VFM system.

In the digital still camera compatible with the DCF & VFM system, character input is carried out by using a liquid crystal display and a cross cursor as shown in FIG. 8, so that a directory name and file names can be edited as in the case with the PC.

As shown in FIG. 5, with regard to information on the directory name or file name edited by the user, the directory is stored in a vfm file and the file is stored in a vlm file.

These two files are analyzed independently on the side of the digital still camera compatible with the DCF & VFM system, or on the side of the PC that uses application software having a VFM analyzing engine. Thus, when information on the name edited in any one of the two apparatuses is copied to the other apparatus, the information can be displayed properly.

In this case, since it is limited that the operation on the side of the digital still camera compatible with the DCF & VFM system complies with the DCF standard, an edit name can be displayed on the liquid crystal display by analyzing the vfm file and vlm file.

On the side of the PC, the files are passed through the VFM analyzing engine so that the directory and files complying with the DCF standard are renamed independently by using the information from the vfm file and vlm file. And then the renamed directory and files are stored in a hard disk on the PC.

As described above, since the vfm file and vlm file, as well as the VFM analyzing engine of the PC application software are introduced, information on the names edited by the user can be maintained in copying or transmitting data alternatively between the digital still camera compatible with the DCF & VFM system and the PC.

FIG. 6 shows a data flow between the digital still camera compatible with the DCF system but not with the VFM system and the PC. In other words, when image data is copied or transmitted to the PC from the digital still camera compatible with the DCF system but not with the VFM system, the image data from the camera is transferred to the hard disk of the PC, as a matter of course, with the name information complying with the DCF standard.

In this case, for some downloaded application software, when the image data is downloaded from the digital still camera to the hard disk of the PC, the user can arbitrarily set a directory name in the objective storing location.

Even in this case, it is not carried out that the user edits arbitrary names to a plurality of files one by one. The editing operation is to be carried out repeatedly by the user operating the keyboard manually on the PC with his hands.

A part that requires attention in the data flow shown in FIG. 6 is where the directory or files having the name information edited on the PC is written back to the digital still camera compatible with the DCF standard but not with the VFM system.

In this case, when the directory or files is copied as it is, the digital still camera complying with the DCF standard cannot recognize the name of the directory or files. As a result, the image itself cannot be displayed.

In order to display the image with the digital still camera complying with the DCF standard, it is required that the image data be transferred from the camera to the PC and the reverse operation of editing the name information be carried out again.

FIG. 7A shows a data flow for the case where data is transferred from the digital still camera compatible with the DCF & VFM system to the digital still camera compatible with the DCF system but not with the VFM system.

FIG. 7B shows a data flow for the case where data is transferred from the digital still camera compatible with the DCF standard but not with the VFM system to the digital still camera compatible with the DCF & VFM system.

In FIG. 7A, dedicated files (vfm, vlm) exist in a group of data outputted from the digital still camera compatible with the DCF & VFM system.

In the DCF standard, however, files not compatible with the standard are to be ignored. Therefore, regardless of the existence or nonexistence of the vfm file or vlm file, the image data itself can be displayed properly in the digital still camera compatible with the DCF standard but not with the VFM system.

Reversely, in FIG. 7B, the vfm file and vlm file do not exist in a group of data outputted from the digital still camera compatible with the DCF standard but not with the VFM system.

Therefore, in the digital still camera compatible with the DCF & VFM system, the vfm file and vlm file can be formed on the basis of the name information complying with the DCF standard. When files other than the vfm file or vlm file have supportable data format, the files can be reproduced without any problem.

According to the aforementioned embodiments, when both of the digital still camera and the PC are to be compatible with the VFM system, the user can maintain the directory name or file name, which the user has arbitrarily given on the side of the digital still camera or the PC, and further maintain the compatibility with the digital still camera complying with the DCF standard but not compatible with the VFM system.

In addition, when a digital still camera is to be compatible with the VFM system, the directory name or file name, which the user has arbitrarily given on the side of the PC, can be displayed in the camera.

When the VFM system is used, it is possible to provide a state where the user cannot see a name of the directory or files defined with the DCF standard, thereby realizing user-friendly file management.

Furthermore, once the user has edit name information in the digital still camera compatible with the VFM system or the PC, it becomes possible to maintain the name information by using the VFM system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of processing files including a first and second apparatuses, each apparatus for recording image data in a built in recording medium in a manner of complying with a file managing structure comparable with a DCF standard, and permitting the first and the second apparatus to mutually transmit the recorded image data therebetween, wherein the method comprises:

setting a virtual directory name in a form not defined as the DCF standard with respect to a directory recorded in each recording medium of the first and second apparatus in a manner of complying with the file managing structure compatible with the DCF standard, forming a virtual directory management file, wherein the virtual directory name is to be compatible with a directory name that corresponds to the virtual directory name and complies with the DCF standard, and maintaining the file on virtual directory management, although transmitting the image data mutually between the first and second apparatus, wherein a directory having the file managing structure compatible with the DCF standard and the virtual directory management file not defined by the DCF standard have different extensions.

2. The method according to claim 1, wherein the first and second apparatus refer to the file on virtual directory management by specifying the virtual directory name and find a directory corresponding to the specified virtual directory name from the DCF standardized file managing structure recorded in the recording medium.

3. The method according to claim 1, wherein the first apparatus is a digital camera and the second apparatus is a personal computer.

4. The method according to claim 1, wherein the first and second apparatuses are digital cameras.

5. An apparatus of processing files including a first apparatus for recording image data in a built in recording medium in a manner of complying with a file managing structure compatible with a DCF standard, and a second apparatus, connected to the first apparatus in a manner capable of transmitting data, for recording image data in a built in recording medium in a manner of complying with a file managing structure compatible with a DCF standard, comprising:

input means for inputting and setting a virtual directory name in a form not defined as the DCF standard with respect to a directory recorded in each recording medium of the first and second apparatus in a manner of complying with the file managing structure compatible with the DCF standard; and recording means for defining the virtual directory name input by the input means as a recording name, forming a virtual directory management file, wherein the virtual directory name is to be compatible with a directory name that corresponds to the virtual directory name and complies with the DCF standard, and recording the file on virtual directory management in the recording medium, wherein the file on virtual directory management is to be maintained, whereas the image data is transmitted mutually between the first and second apparatus, wherein a directory having the file managing structure compatible with the DCF standard and the virtual directory management file not defined by the DCF standard have different extensions.

6. The apparatus according to claim 5, wherein the first and second apparatus comprise control means for referring to the file on virtual directory management by specifying the virtual directory name and finding a directory corresponding to the specified virtual directory name from the DCF standardized file managing structure recorded in the recording medium.

7. The apparatus according to claim 5, wherein the first apparatus is a digital camera and the second apparatus is a personal computer.

8. The apparatus according to claim 5, wherein the first and second apparatuses are digital cameras.

9. An apparatus of processing files including a first apparatus for recording image data in a built in recording medium in a manner of complying with a file managing structure compatible with a DCF standard, and a second apparatus, connected to the first apparatus in a manner capable of transmitting data, for recording image data in a built in recording medium in a manner of complying with a file managing structure compatible with a DCF standard, comprising:

an input section inputting and setting a virtual directory name in a form not defined as the DCF standard with respect to a directory recorded in each recording medium of the first and second apparatus in a manner of complying with the file managing structure compatible with the DCF standard; and a recording section defining the virtual directory name input by the input section as a recording name, forming a virtual directory management file, wherein the virtual directory name is to be compatible with a directory name that corresponds to virtual directory name and complies with the DCF standard, and recording the file on virtual directory management in the recording medium, wherein the file on virtual directory management is to be maintained, whereas the image data is transmitted mutually between the first and second apparatus, wherein a directory having the file managing structure compatible with the DCF standard and the virtual directory management file not defined by the DCF standard have different extensions.

10. The apparatus according claim 9, wherein the first and second apparatus comprise control sections for referring to the file on virtual directory management by specifying the virtual directory name and find a directory corresponding to the specified virtual directory name from the DCF standardized file managing structure recorded in the recording medium.

11. The apparatus according to claim 9, wherein the first apparatus is a digital camera and the second apparatus is a personal computer.

12. The apparatus according to claim 9, wherein the first and second apparatuses are digital cameras.

* * * * *